(12) United States Patent
Chefd'hotel

(10) Patent No.: US 7,440,628 B2
(45) Date of Patent: Oct. 21, 2008

(54) METHOD AND SYSTEM FOR MOTION CORRECTION IN A SEQUENCE OF IMAGES

(75) Inventor: Christophe Chefd'hotel, Princeton, NJ (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 506 days.

(21) Appl. No.: 11/205,569

(22) Filed: Aug. 17, 2005

(65) Prior Publication Data

US 2006/0045366 A1   Mar. 2, 2006

Related U.S. Application Data

(60) Provisional application No. 60/605,759, filed on Aug. 31, 2004.

(51) Int. Cl.
G06K 9/32 (2006.01)
G06K 9/36 (2006.01)

(52) U.S. Cl. ....................... 382/236; 382/294

(58) Field of Classification Search ......... 382/128–134, 382/154, 195, 199, 201, 206, 254, 274, 275, 382/294–296, 236; 375/240.12, 240.16
See application file for complete search history.

(56) References Cited

U.S. PATENT DOCUMENTS

| | | | |
|---|---|---|---|
| 5,633,951 A * | 5/1997 | Moshfeghi | 382/154 |
| 6,169,817 B1 * | 1/2001 | Parker et al. | 382/131 |
| 6,285,711 B1 * | 9/2001 | Ratakonda et al. | 375/240.16 |
| 6,757,423 B1 | 6/2004 | Amini | |
| 6,831,948 B1 * | 12/2004 | Van Dijk et al. | 375/240.12 |
| 2002/0167537 A1 | 11/2002 | Trajkovic | |

FOREIGN PATENT DOCUMENTS

WO   WO 02/056241 A1   7/2002

OTHER PUBLICATIONS

Shade, Jonathan et al., "Layered Depth Images," Jul. 19, 2998 *Computer Graphics Proceedings* pp. 238, XP002270434 Abstract.
International Search Report, Aug. 17, 2005.

* cited by examiner

*Primary Examiner*—Kanji Patel

(57) ABSTRACT

A method for motion compensation between first and second images in a temporal sequence includes processing the first and second images in a reduction process for providing respective reduced resolution first and second images; deriving respective first and second feature maps from the respective reduced resolution first and second images, the feature maps including deriving the respective Laplacian of image data in the respective reduced resolution first and second images; deriving a displacement field by processing the first and second feature maps in accordance with a registration algorithm, the registration algorithm comprising solving, for each picture element or voxel, a local Gaussian weighted least mean square problem so as to derive respective vectors forming the displacement field; and warping the second image with the displacement field.

44 Claims, 2 Drawing Sheets

METHOD AND SYSTEM FOR MOTION CORRECTION IN A SEQUENCE OF IMAGES

CROSS-REFERENCE TO RELATED APPLICATIONS PRIORITY

Specific reference is hereby made to U.S. Provisional Patent Application No. 60/605,759, entitled A GAUSSIAN WEIGHTED LEAST MEAN SQUARE REGISTRATION ALGORITHM FOR BREAST MR MOTION CORRECTION, filed Aug. 31, 2004 in the name of CHRISTOPHE CHEFD'HOTEL, the inventor in the present application, and of which the benefit of priority is claimed and whereof the disclosure is hereby incorporated herein by reference.

FIELD OF THE INVENTION

The present application relates generally to motion correction in imaging and, more particularly, to motion compensation as it pertains to correction for subject motion as may occur, for example, in a temporal sequence of images such as may be obtained by a medical imaging process.

BACKGROUND OF THE INVENTION

Medical imaging techniques are used in many medical procedures, including, for example, in the detection of cancer or precancerous conditions in a patient. An important application is in the detection of tumors or potential tumors in breast cancer. Potential tumors are difficult to detect. Among available techniques providing potentially helpful information, it is known, for example, that such tumor-related tissue may typically exhibit a more rapid intake (wash-in) of contrast agent, as well as a more rapid washout than adjacent, non-tumor tissue. Characteristics such as these and others, may be helpful in certain diagnoses involving detection of suspect tissue and identifying tissue characteristics through a comparison of images of a patient made before and after a procedure, such as wash-in and/or washout of contrast agent. Using such time sequential images made by an imaging technique such as magnetic resonance imaging (MRI), a comparison may be made between images to detect differences in behavior exhibited by different regions of the acquired MR volume.

A technique for performing this detection advantageously requires one to track the intensity of a single voxel in a temporal sequence of such volumes. However, a difficulty arises in that the patient typically moves between consecutive acquisitions and thereby introduces motion-related differences between the acquired images whereby a single point in space can no longer be tracked, unless motion correction is performed. As used herein, a point in space is not intended to mean a classical geometrically defined point of no dimension but rather a point resulting from a digitization procedure having the small dimensions of elements which go to make up a digitized image.

Prior art approaches to solving this problem in the past have computed the optic-flow between two images, of which an arbitrary one is selected as reference among the images of the sequence. For example, the two images can be obtained from the acquired images by computing a Laplacian pyramid. The optic flow may, for example, be calculated by solving a minimization problem of the point-to-point difference between the two Laplacian images.

BRIEF SUMMARY OF THE INVENTION

It is an object of the present invention to solve the motion correction or compensation problem in an advantageous manner in, for example, breast MR detection of potential tumors which are detected as tissue that has a rapid intake (wash-in) of contrast agent, as well as a rapid washout.

In accordance with an aspect of the invention, first and second images of a patient are obtained time sequentially from an imaging process such as an MRI apparatus, wherein the second and later image may include differences from the first and earlier image due to, for example, patient movement after the first image was taken. The images are processed in a reduction process resulting in respective first and second images of lower resolution as compared with the original images. Respective first and second feature maps are derived from the first and second images of lower resolution by deriving the respective Laplacian of the image data in the first and second images of lower resolution. Based on a given initial displacement field, the feature maps are processed in a registration procedure, in accordance with a registration algorithm. The algorithm comprises solving, for each voxel, a local Gaussian weighted least mean square problem so as to derive respective vectors which form a dense displacement field for modeling the deformation. The displacement field is utilized to warp the second image so as to obtain a motion corrected second image.

A default condition for the given initial displacement field can, for example be, a null set or zero displacement, or the given initial displacement field can take into account prior knowledge of a patient's motion.

In accordance with another aspect of the invention, a method for motion compensation between first and second images in a temporal sequence comprises: deriving respective first and second feature maps from the first and second images; deriving a displacement field by processing the first and second feature maps in accordance with a registration algorithm, the registration algorithm comprising solving, for each picture element or voxel, a local Gaussian weighted least mean square problem so as to derive respective vectors forming the displacement field; and warping the second image with the displacement field.

In accordance with another aspect of the invention, the step of deriving a displacement field utilizes a previously derived displacement field for deriving the displacement field and the step of deriving a displacement field utilizes a given initial displacement field for an initial derivation of the displacement field.

A default condition for the given initial displacement field is a null set or, for example, the given initial displacement field may take into account prior knowledge of a patient's motion.

In accordance with another aspect of the invention, the step of deriving a displacement field is repeated, wherein each repetition is performed on first and second feature maps corresponding to the first and second images having higher resolutions than for the previous repetition.

In accordance with another aspect of the invention, each repetition utilizes a previously derived displacement field from the immediately preceding step.

In accordance with another aspect of the invention, the step of deriving a displacement field utilizes a given displacement field for an initial derivation of the displacement field.

In accordance with another aspect of the invention, the step of deriving a displacement field comprises a step of expanding the previously derived displacement field to the resolution level of the increasing resolution versions.

In accordance with another aspect of the invention a method for motion compensation includes a step of utilizing a displacement field derived at the highest resolution present for warping the second image to produce a motion corrected image.

In accordance with another aspect of the invention, the step of deriving respective first and second feature maps comprises deriving the respective Laplacian of image data in the respective reduced resolution first and second images.

In accordance with another aspect of the invention, a method for motion compensation between first and second images in a temporal sequence comprises: processing the first and second images in a reduction process for providing respective reduced resolution first and second images; deriving respective first and second feature maps from the respective reduced resolution first and second images, the feature maps including deriving a respective Laplacian of image data in the respective reduced resolution first and second images; deriving a displacement field by processing the first and second feature maps in accordance with a registration algorithm, the registration algorithm comprising solving, for each picture element or voxel, a local Gaussian weighted least mean square problem so as to derive respective vectors forming the displacement field; and warping the second image with the displacement field.

In accordance with another aspect of the invention a method for motion compensation between first and second images in a temporal sequence, the method comprises: processing the first and second images in a reduction process for providing respective reduced resolution first and second images; deriving respective first and second feature maps from the respective reduced resolution first and second images; deriving a displacement field by processing the first and second feature maps in accordance with a registration algorithm, the registration algorithm comprising solving, for each picture element or voxel, a local Gaussian weighted least mean square problem so as to derive respective vectors forming the displacement field; and warping the second image with the displacement field.

In accordance with another aspect of the invention, a method for motion compensation between a reference image and a floating image in a temporal sequence, the method comprises: deriving a first set of modified images of progressively decreasing resolution from the reference image; deriving a second set of modified images of progressively decreasing resolution from the floating image; deriving a first set of feature maps from the first set of modified images; deriving a second set of feature maps from the second set of modified images; deriving a first displacement field from the lowest resolution members of each of the first and second sets of feature maps, respectively, and a given initial displacement field, in accordance with a registration algorithm, the registration algorithm comprising solving, for each picture element or voxel, a local Gaussian weighted least mean square problem so as to derive respective vectors forming the displacement field; deriving a second displacement field from the next to the lowest resolution members of each of the first and second sets of feature maps, respectively, and the first displacement field obtained in the preceding step, in accordance the registration algorithm; repeating the foregoing step for successively higher resolution members, if any are present, of each of the first and second sets of feature maps, respectively and using in each case the displacement field obtained in the step preceding the current step, until the resolution of the floating image is reached and, if no higher resolution members are present, then proceeding directly to the next step; and warping the floating image with the last obtained displacement field.

In accordance with another aspect of the invention, a method for motion compensation between a reference image and a floating image in a temporal sequence, the method comprises: (a) processing the reference and floating images in respective first and second pluralities of cascaded resolution reduction processes for providing respective pluralities of successively reduced resolution reference and floating images, herein referred to as Level $0$ for the lowest resolution level and Level $1$ for the next higher resolution level, Level $2$ for the second next higher resolution level, and so forth for any existing higher resolution levels; (b) deriving respective pluralities of reference and floating feature maps from the respective pluralities of successively reduced resolution reference and floating images, at resolution levels L $0$, L $1$, L $2$ and so forth; (c) deriving a first displacement field by processing a reference and a floating feature map, corresponding to level L $0$, in accordance with a registration algorithm, the registration algorithm comprising solving, for each picture element or voxel, a local Gaussian weighted least mean square problem based on a given initial displacement field, so as to derive respective vectors forming the first displacement field; (d) expanding the first displacement field to a resolution level compatible with that of resolution L $1$, to provide an expanded first displacement field; (e) deriving a second displacement field by processing a reference and a floating feature map, corresponding to resolution level L $1$, in accordance with the registration algorithm based on the expanded first displacement field, so as to derive respective vectors forming the second displacement field; (f) expanding the second displacement field to a resolution level compatible with that of resolution L $1$, to provide an expanded second displacement field; (g) deriving a third displacement field by processing a reference and a floating feature map, corresponding to resolution level L $2$, in accordance with the registration algorithm based on the expanded second displacement field, so as to derive respective vectors forming the second displacement field; and (h) if L $2$ is the resolution level of the reference and floating images, then warping the floating image by utilizing the third displacement field and ending; and if not, then (i) expanding the third displacement field to a resolution level compatible with the next higher resolution level to provide an expanded third displacement field, and (j) repeating the sequence of steps beginning with step (g) with appropriate modification of resolution levels for obtaining a displacement field corresponding to increasingly higher levels of resolution based on the last previously obtained expanded displacement field until the resolution level of the reference and floating images is reached and thereupon warping the floating image with the final displacement field obtained and ending.

In accordance with another aspect of the invention, the step of providing respective pluralities of successively reduced resolution reference and floating images comprises deriving the respective Laplacian of image data in the respective pluralities of successively reduced resolution reference and floating images.

In accordance with another aspect of the invention, the step of deriving a first displacement field comprises inputting a given initial displacement field.

In accordance with another aspect of the invention, a method for motion compensation between first and second images in a temporal sequence comprises: deriving respective first and second feature maps from respective reduced resolution first and second images; deriving a first displacement field by processing the first and second feature maps in accordance with a registration algorithm, the registration algorithm comprising solving, for each picture element or voxel, a local Gaussian weighted least mean square problem so as to derive respective vectors forming the displacement field; expanding the first displacement field to correspond with the resolution of the first and second images; deriving a second displacement field by processing the first and second images in accordance with the registration algorithm based on the first displacement field; and warping the second image with the second displacement field so as to obtain a motion corrected image.

In accordance with another aspect of the invention, a method for motion compensation between first and second images in a temporal sequence comprises: deriving from the first image a first succession of images having progressively reduced resolution; deriving from the second image a second succession of images having progressively reduced resolution; deriving from the first succession of images a first succession of feature maps; deriving from the second succession of images a second succession of feature maps; deriving a succession of displacement fields by processing feature maps of the first succession of feature maps with corresponding feature maps the second succession of feature maps, pertaining to the same resolution, in accordance with a registration algorithm for providing a respective displacement field, the registration algorithm comprising solving, for each picture element or voxel, a local Gaussian weighted least mean square problem so as to derive respective vectors forming the displacement field, starting with a given displacement field being used for deriving a first displacement field at the lowest resolution level and thereafter utilizing the immediately previous displacement field for deriving the next displacement field corresponding to the next higher resolution in the succession; and warping the second image utilizing a final displacement field at the resolution level of the first and second images.

In accordance with another aspect of the invention a method for motion compensation between a reference image and a floating image in a temporal sequence comprises: (a) processing the reference and floating images in respective first and second pluralities of cascaded resolution reduction processes for providing respective pluralities of successively reduced resolution reference and floating images, herein referred to as Level 0 for the lowest resolution level and Level 1 for the next higher resolution level, Level 2 for the second next higher resolution level, and so forth for any existing higher resolution levels; (b) deriving respective pluralities of reference and floating feature maps from the respective pluralities of successively reduced resolution reference and floating images, at resolution levels L 0, L 1, L 2, in order of increasing resolution with L2 being the resolution level of the reference and floating images; (c) deriving a first displacement field by processing a reference and a floating feature map, corresponding to level L 0, in accordance with a registration algorithm, the registration algorithm comprising solving, for each picture element or voxel, a local Gaussian weighted least mean square problem based on a given initial displacement field, so as to derive respective vectors forming the first displacement field; (d) expanding the first displacement field to a resolution level compatible with that of resolution L 1, to provide an expanded first displacement field; (e) deriving a second displacement field by processing a reference and a floating feature map, corresponding to resolution level L 1, in accordance with the registration algorithm based on the expanded first displacement field, so as to derive respective vectors forming the second displacement field; (f) expanding the second displacement field to a resolution level compatible with that of resolution L 2, to provide an expanded second displacement field; (g) deriving a final displacement field by processing a reference and a floating feature map, corresponding to resolution level L 2, in accordance with the registration algorithm based on the expanded second displacement field, so as to derive respective vectors forming the final displacement field; and (h) warping the floating image by utilizing the final displacement field.

In accordance with another aspect of the invention, a system for performing image motion compensation comprises: a memory device for storing a program and other data; and a processor in communication with the memory device, the processor operative with the program to perform: a method for motion compensation between first and second images in a temporal sequence, the method comprising: processing the first and second images in a reduction process for providing respective reduced resolution first and second images; deriving respective first and second feature maps from the respective reduced resolution first and second images; deriving a displacement field by processing the first and second feature maps in accordance with a registration algorithm, the registration algorithm comprising solving, for each picture element or voxel, a local Gaussian weighted least mean square problem so as to derive respective vectors forming the displacement field; and warping the second image with the displacement field.

In accordance with another aspect of the invention, a computer program product comprises a computer useable medium having computer program logic recorded thereon for program code for performing image motion compensation by a method for motion compensation between first and second images in a temporal sequence, comprising: processing the first and second images in a reduction process for providing respective reduced resolution first and second images; deriving respective first and second feature maps from the respective reduced resolution first and second images; deriving a displacement field by processing the first and second feature maps in accordance with a registration algorithm, the registration algorithm comprising solving, for each picture element or voxel, a local Gaussian weighted least mean square problem so as to derive respective vectors forming the displacement field; and warping the second image with the displacement field.

BRIEF DESCRIPTION OF THE DRAWINGS

The invention will be more fully understood from the detailed description, including exemplary embodiments, which follows, in conjunction with the drawings, in which.

DETAILED DESCRIPTION OF THE INVENTION

Figure 1:
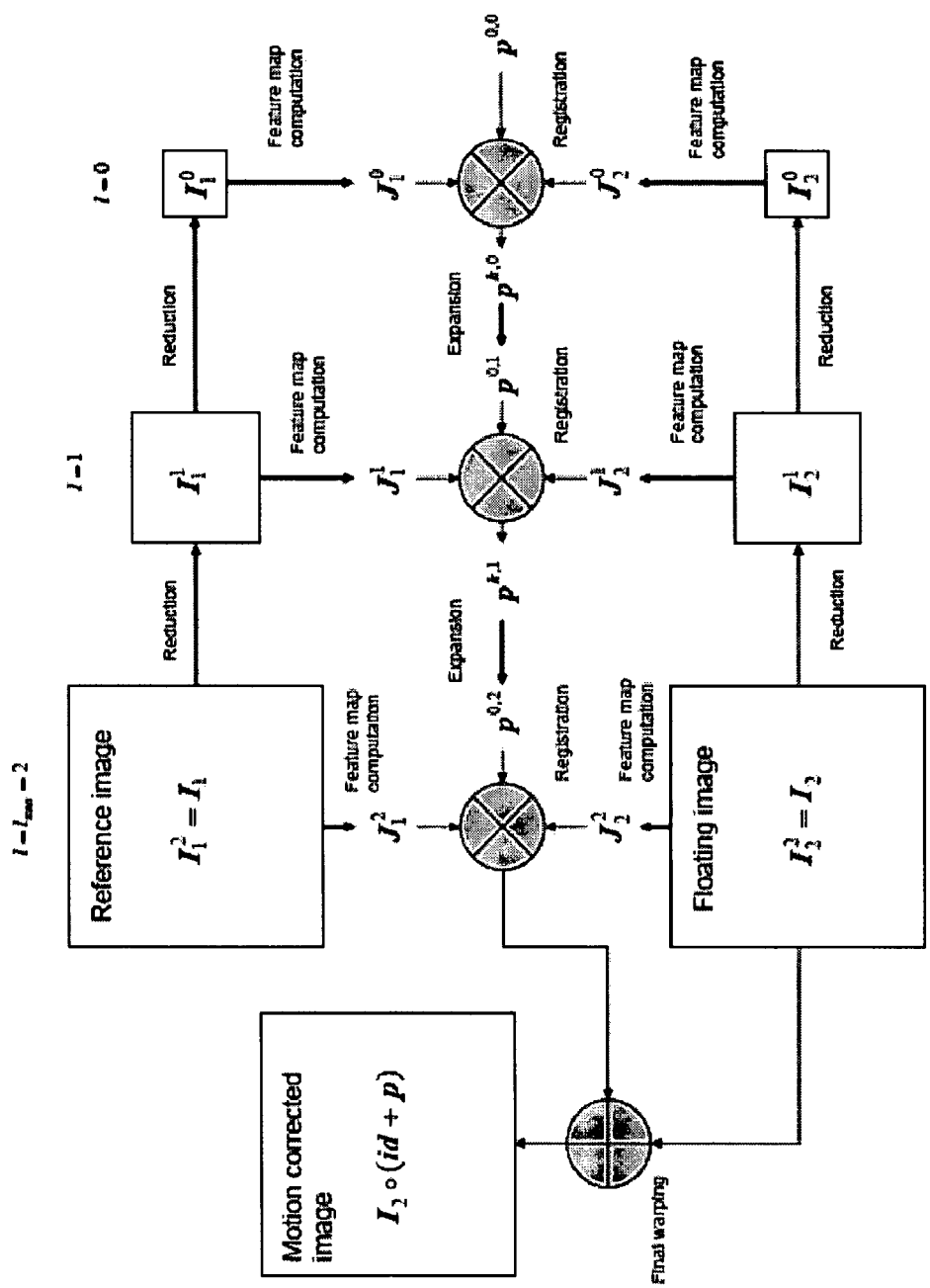
FIG. 1 shows, in flow chart format, motion correction from a temporal sequence of images in accordance with the principles of the invention.

In accordance with an embodiment of the invention, a reference image of a patient is obtained by a medical imaging procedure such as utilizing an MRI apparatus, and a floating image, typically taken at a later time than the reference image. The floating image may include differences from the reference image due to, for example, patient movement after the first image was taken. The images are processed in a reduction process resulting in respective reference image and a floating images of lower resolution as compared with the original respective images. Respective reference image and floating image feature maps are derived from the reference and floating images of lower resolution by deriving the respective Laplacian of the image data in the reference and floating images of lower resolution. Based on a given initial displacement field, the feature maps are processed in a registration procedure, in accordance with a registration algorithm. The algorithm comprises solving, for each voxel, a local Gaussian weighted least mean square problem so as to derive respective vectors which form a dense displacement field for modeling the deformation. The displacement field is utilized to warp the floating image so as to obtain a motion corrected second image. As stated above, a possible default condition for the given initial displacement field is a null set or, for example, the given initial displacement field may take into account prior knowledge of a patient's motion.

A Gaussian weighted least mean square registration algorithm for breast MR motion correction is applied for providing motion correction in the detection of tumor-related tissue and a non-rigid registration algorithm for breast MR motion correction is applied for providing motion correction in the detection of tumor-related tissue. The deformation is modeled as a dense displacement field, formed of vectors obtained by solving a series of local Gaussian weighted least mean square problems, as will hereinafter be described.

The registration algorithm is utilized to estimate dense displacement fields between volumetric images. An objective is to compensate for motion artifacts in time sequences of magnetic resonance (MR) images. Typically, motion artifacts are mainly due to breathing, cardiac motion, and the patient's movements. A principal field of application for this invention is the study of intensity changes in breast MR studies. Temporal variations of contrast agent intakes in the breast tissue may be used to provide information helpful in detecting lesions. Computing such variations requires an accurate spatial alignment of the breast tissue between image acquisitions.

It is herein recognized that the introduction of the Gaussian weighting, implemented using a fast filtering technique, offers at least two advantages, namely:

it provides a simple and computationally efficient way to ensure the smoothness of the displacement field, thus preventing singularities and offering an implicit model of the deformations regularity); and it ensures that the least mean square problems are suitably formulated.

In addition, image similarity measure in accordance with principles of the present invention relies on the computation of the image Laplacian, rather than using image intensities. The present inventor has found that this approach is effective in coping with intensity changes due to contrast agent intakes. A multi-resolution strategy is used to improve the capture range, speed, and robustness of the approach.

The invention will be explained in further detail by way of illustrative examples. For the purpose of the present illustrative example of the present invention, it is assumed that the intensities of the pair of images to be registered are sampled versions, on a regular grid, of two real-valued functions $I_1:\Omega \mapsto R$ and $I_2:\Omega \mapsto R$, $\Omega \subset R^3$, where the symbols have their conventional meaning; thus, in the present example $I_2$ is a function comprising a maplet of an input $\Omega$ and output $R$ where $\Omega$ is a proper subset of $R^3$, and so forth. Note that we are dealing here with the case of volumetric images; but the subsequent developments extend readily to arbitrary dimensions.

In the following, we will refer to $I_1$ as the reference image and to $I_2$ as the floating image. We define the registration problem as finding a displacement field $p:\Omega \mapsto \Omega$ (which will be estimated at grid points) maximizing the similarity between $I_1$ and a warped version of the floating image $I_2 \circ (id+p)$ (where id is the identity map and $\circ$ is the composition operator).

Image intensity is not always the best feature to perform a registration task. From this perspective, it is sometimes useful to work with auxiliary functions $J_1:\Omega \mapsto 1$ R and $J_2:\Omega \mapsto R$, computed from $I_1$ and $I_2$, that represent other image features (e.g. the image Laplacian, or the norm of the image gradient). Particularly in the application to breast MR, computing the image Laplacian has been very effective in practice.

The algorithm is iterative. It comprises building a sequence of displacement fields $p^0, p^1, \ldots, p^k$ converging towards the "true" motion field. The final "motion corrected" image is given by $I_2 \circ (id+p^k)$. The iterative construction of the displacement field, which forms the core of this registration technique, is described below.

The iterative procedure is applied in combination with a coarse-to-fine multi-resolution strategy. The advantages of this approach are:

improved capture range, by reducing the risk of getting trapped into local minima; and reduced computational cost, by working with fewer data at a lower resolution.

The multi-resolution strategy can be described by way of example as follows:

Build two multi-resolution pyramids for the reference and floating images by averaging and sub-sampling. This type of pyramid construction is a standard technique of image processing; reference is made, for example, to the textbook by 2. R. Gonzales and R. Woods, *Digital Image Processing, $2^{nd}$ Edition*, Prentice-Hall, 2002 for details.

Let $I_1^l$ and $I_2^l$ be the resulting images at resolution l.

Compute the corresponding feature images labeled $J_1^l$ and $J_2^l$.

Let $p^{k,l}$ be the displacement field obtained after the $k^{th}$ iteration at resolution l. $p^{0,0}$ denotes the initial displacement field at the lowest resolution (generally a null field). At resolution l, run the registration algorithm for a fixed number of iterations as will be further explained below. Expand the displacement field to the next resolution by tri-linear interpolation and scaling. Use this result as the initial displacement field $p^{0,l+1}$.

Perform the previous operation until the original resolution is reached.

These steps are illustrated in summary diagrammatic fashion in FIG. 1. In reference to FIG. 1, the resolution is indicated as "l". The three levels depicted in this figure are by way of an exemplary embodiment and for illustrative purposes; more or fewer expansion steps are contemplated within the scope of the present invention. In FIG. 1, the reference and floating images, shown as $I_1$ and $I_2$ respectively, at a resolution level $l=l_{max}=2$ are subject to a first reduction process resulting in respective images $I_1^1$ and $I_2^1$ at a resolution $l=1$ and following a further reduction process, the resulting images are $I_1^0$ and $I_2^0$, respectively at a resolution level of $l=0$. Feature maps $J_1^0$ and $J_2^0$ are derived from images $I_1^0$ and $I_2^0$, respectively. Feature maps $J_1^0$ and $J_2^0$ undergo a registration process, as herein described, using a given initial displacement field $p^{0,0}$. This initial displacement field may be arbitrary and may be zero. The registration process results in a displacement field $p^{k,0}$ which may be thought of as an improved displacement field as compared with the initial displacement field. Displacement field $p^{k,0}$ then undergoes an expansion, or dilatation corresponding to the image resolution $l=1$, resulting in an expanded resolution field $p^{0,1}$.

Feature maps $J_1^1$ and $J_2^1$ are derived from images $I_1^1$ and $I_2^1$, respectively. Feature maps and $J_1^1$ and $J_2^1$ undergo a registration process, as herein described, using the previously derived expanded displacement field $p^{0,1}$, so as to result in a displacement field $p^{k,1}$ which is expanded to $p^{0,2}$. Similar steps as before are performed with images $I_1^2$ and $I_2^2$ which result in a final deformation field which used to perform a final warping of image $I_2$ to produce a motion corrected image represented by $I_2 \circ (id+p)$ as is herein explained.

It is noted that it is only necessary to set the intrinsic parameters of the algorithm to the following:
The number of pyramid levels,
the number of iterations at each level, and
a regularization parameters σ that controls the smoothness of the displacement field: this parameter is discussed below.

A more detailed description of the Gaussian weighted least mean square algorithm in accordance with the present invention is set forth next, followed by a description of the feature map computation, in accordance with the principles of the present invention.

A core concept of the registration technique will first be particularly described. The following iterative procedure is performed at a given resolution. The resolution level l in the following notations is omitted.

Let $G_\sigma(x)$ be an isotropic tri-dimensional Gaussian kernel:

$$G_\sigma(x) = \frac{1}{\sqrt{(2\pi)^3 \sigma^6}} e^{-\frac{|x|^2}{\sigma^2}}$$

of standard deviation σ.

Each voxel is labeled by an index j. Its coordinates are given by a vector $x_j \in R^3$. We call $p_j^k \in R^3$ the displacement vector recovered at point $x_j$ after the $k^{th}$ iteration of the algorithm. Given a set of displacement vectors $p_j^k$, the corrected version of the floating feature map at iteration k is denoted $J_{2,k}$:

$$\forall j, J_{2,k}(x_j) = J_2(x_j + p_j^k)$$

At each voxel j, it is proposed to define an update rule $p_j^{k+1} = p_j^k + s_j^k$ with $s_j^k$ solution of the non-linear least mean square problem:

$$\min_{s_j^k} \sum_i G_\sigma(x_j - x_i) \cdot (z_i^k(s_j^k))^2$$

where $z_i^k(s) = J_1(x_i) - J_{2,k}(x_i + s)$. The Gaussian weighting allows control (implicitly) of the neighborhood size used to estimate the displacement. As a byproduct it also ensures the overall smoothness of the deformation field.

In practice, a linearized version of the previous problem is solved by minimizing the following criterion:

$$E(s_j^k) = \sum_i G_\sigma(x_j - x_i) \cdot \left(z_i^k(0) + \nabla z_i^k(0)^T \cdot s_j^k\right)^2$$

where $\nabla z_i^k(s)$ is defined as $\nabla z_i^k(s) = -\nabla J_{2,k}(x_i + s)$.

By computing the first variation of $E(s_j^k)$, the necessary condition of optimality $$\forall h, dE(s_j^k) \cdot h = 0$$

yields a closed-form solution for $s_j^k$:

$$s_j^k = -\left(\sum_i G_\sigma(x_j - x_i) \nabla z_i^k(0) \nabla z_i^k(0)^T\right)^{-1} \left(\sum_i G_\sigma(x_j - x_i) \nabla z_i^k(0) z_i^k(0)\right)$$

Note that the matrices $\nabla z_i^k(0) \nabla z_i^k(0)^T$ are symmetrical and can be characterized by 6 coefficients. The vectors $\nabla z_i^k(0) z_i^k(0)$ are defined by 3 coefficients.

Once these coefficients are computed, it is seen that estimating a displacement update reduces to performing a convolution of the matrix and vector coefficients by a Gaussian kernel, and to solving a 3×3 symmetric linear problem at each grid point.

Convolutions are approximated using the $2^{nd}$ order recursive filters as proposed in the publication R. Deriche, *Fast algorithms for low-level vision*, IEEE Transactions on Pattern Analysis and Machine Intelligence, 1(12), 1990, p. 78-88. These filters reduce the computational effort required to approximate a Gaussian smoothing, as well as its derivatives. With this approach, the operations are performed with a fixed number of multiplications and additions per output point, independently of the filter size.

A closed form solution is used for the 3×3 linear problem. If $$\sum_i G_\sigma(x_j - x_i) \nabla z_i^k(0) \nabla z_i^k(0)^T$$

is given by a symmetrical matrix $$A = \begin{pmatrix} a_1 & a_2 & a_3 \\ a_2 & a_4 & a_5 \\ a_3 & a_5 & a_6 \end{pmatrix}$$

Its inverse is $$A^{-1} = \frac{1}{a_6 a_1 a_4 - a_1 a_5^2 - a_6 a_2^2 + 2 a_2 a_3 a_5 - a_4 a_3^2} \begin{pmatrix} c_1 & c_2 & c_3 \\ c_2 & c_4 & c_5 \\ c_3 & c_5 & c_6 \end{pmatrix}$$

where $$\begin{cases} c_1 = a_6 a_4 - a_5^2 \\ c_2 = a_3 a_5 - a_6 a_2 \\ c_3 = a_2 a_5 - a_3 a_4 \\ c_4 = a_1 a_6 - a_3^2 \\ c_5 = a_3 a_2 - a_1 a_5 \\ c_6 = a_1 a_4 - a_2^2 \end{cases}$$

In all previous computations, a tri-linear interpolation scheme is used when values are needed outside grid points.

A description of the feature map computation follows next. In breast MR, contrast agent intakes can significantly, and locally, change the intensity values of the observed tissues. Rather than relying on intensities for registration, the values of the functions $J_1$ and $J_2$ are taken as the Laplacian of the original data. The idea is to focus on the edge information in the images (zero-crossings of the Laplacian characterizing edges), which is less affected by contrast intakes. This approach proved to be very effective in practice. A triplet of integers ($i_1, i_2, i_3$) is now used to identify a voxel using a Cartesian coordinate system, and the following finite difference scheme is applied for the Laplacian:

$$J_2(i_1, i_2, i_3) = \frac{I_2(i_1, i_2, i_3 + 1)}{\lambda^2} + \frac{I_2(i_1, i_2, i_3 - 1)}{\lambda^2} + I_2(i_1, i_2 + 1, i_3) + I_2(i_1, i_2 - 1, i_3) + I_2(i_1 + 1, i_2, i_3) + I_2(i_1 - 1, i_2, i_3) - \left(4 + \frac{2}{\lambda^2}\right) I_2(i_1, i_2, i_3)$$

Note that the centered difference scheme used to estimate the Laplacian operator takes into account the voxels' anisotropy. The coefficient $\lambda$ corresponds to the ratio between the voxel spacing along the third axis (distance between slices) and the voxel spacing along the first two axes (herein assumed to be identical).

The same equation applies to the computation of $J_1$ from $I_1$.

Figure 2:
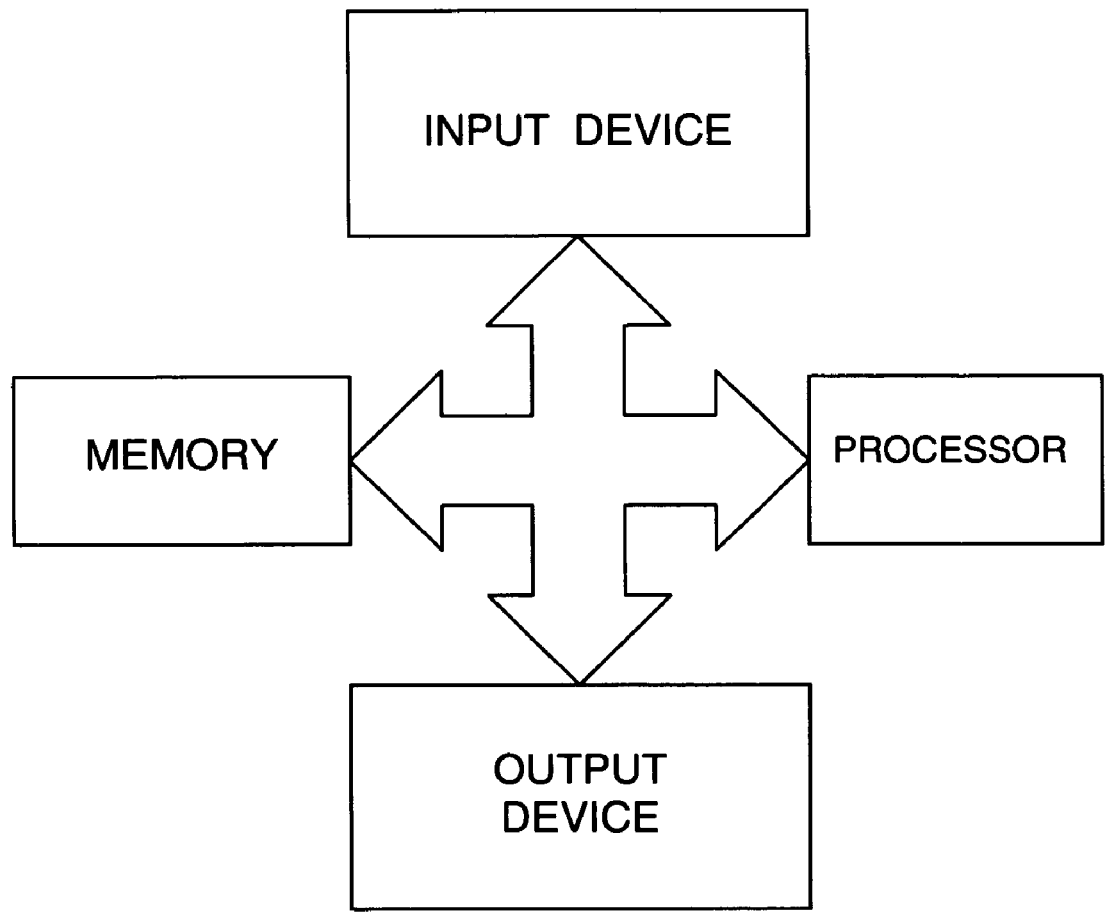
FIG. 2 shows in schematic form the application of a programmable digital computer for implementation of the invention.

As will be apparent, the present invention is intended to be implemented with the use and application of a programmed digital computer. FIG. 2 shows in basic schematic form a digital processor coupled for two way data communication with an input device, an output device, and a memory device for storing a program and other data. The input device is so designated in broad terms as a device for providing an appropriate image or images for processing in accordance with the present invention. For example, the input may be from an imaging device, such as a device incorporated in a CATSCAN, X-ray machine, an MRI or other device, or a stored image, or by communication with another computer or device by way of direct connection, a modulated infrared beam, radio, land line, facsimile, or satellite as, for example, by way of the World Wide Web or Internet, or any other appropriate source of such data. The output device may include a computer type display device using any suitable apparatus such as a cathode-ray kinescope tube, a plasma display, liquid crystal display, and so forth, or it may or may not include a device for rendering an image and may include a memory device or part of the memory device of FIG. 2 for storing an image for further processing, or for viewing, or evaluation, as may be convenient, or it may utilize a connection or coupling including such as are noted above in relation to the input device. The processor is operative with a program set up in accordance with the present invention for implementing steps of the invention. Such a programmed computer may interface readily through communications media such as land line, radio, the Internet, and so forth for image data acquisition and transmission.

The invention may be readily implemented, at least in part, in a software memory device and packaged in that form as a software product. This can be in the form of a computer program product comprising a computer useable medium having computer program logic recorded thereon for program code for performing image motion compensation utilizing the method of the present invention.

While the present invention has been explained by way of examples using illustrative exemplary embodiments relating to motion compensation in a temporal sequence of images in MRI detection of potential tumors of the human breast, the invention is also generally applicable to the solution of problems requiring spatial alignment in other fields such as, but not limited to, the example of PET-CT registration.

It will be understood that the description by way of exemplary embodiments is not intended to be limiting and that various changes and substitutions not herein explicitly described may be made without departing from the spirit of the invention whose scope is defined by the claims following.

What is claimed is:

1. A method for motion compensation between first and second images in a temporal sequence, said method comprising:
deriving respective first and second feature maps from said first and second images;
deriving a displacement field by processing said first and second feature maps in accordance with a registration algorithm, said registration algorithm comprising solving, for each picture element or voxel, a local Gaussian weighted least mean square problem so as to derive respective vectors forming said displacement field; and
warping said second image with said displacement field.

2. A method for motion compensation in accordance with claim 1, wherein said step of deriving a displacement field utilizes a previously derived displacement field for deriving said displacement field.

3. A method for motion compensation in accordance with claim 2, wherein said step of deriving a displacement field utilizes a given initial displacement field for an initial derivation of said displacement field.

4. A method for motion compensation in accordance with claim 3, wherein: a default condition for said given initial displacement field is a null set.

5. A method for motion compensation in accordance with claim 3, wherein: said given initial displacement field takes into account prior knowledge of a patient's motion.

6. A method for motion compensation in accordance with claim 2, comprising repeating the step of deriving a displacement field, wherein each repetition is performed on first and second feature maps corresponding to said first and second images having higher resolutions than for the previous repetition.

7. A method for motion compensation in accordance with claim 2, wherein each repetition utilizes a previously derived displacement field from the immediately preceding step.

8. A method for motion compensation in accordance with claim 7, wherein said step of deriving a displacement field utilizes a given displacement field for an initial derivation of said displacement field.

9. A method for motion compensation in accordance with claim 7, wherein:
said step of deriving a displacement field comprises a step of expanding said previously derived displacement field to the resolution level of said increasing resolution versions.

10. A method for motion compensation in accordance with claim 7, including a step of utilizing a displacement field derived at the highest resolution present for warping said second image to produce a motion corrected image.

11. A method for motion compensation in accordance with claim 7, wherein:
said step of deriving respective first and second feature maps comprises deriving the respective Laplacian of image data in said respective reduced resolution first and second images.

12. A method for motion compensation between first and second images in a temporal sequence comprises:
processing said first and second images in a reduction process for providing respective reduced resolution first and second images;

deriving respective first and second feature maps from said respective reduced resolution first and second images, said feature maps including deriving a respective Laplacian of image data in said respective reduced resolution first and second images;

deriving a displacement field by processing said first and second feature maps in accordance with a registration algorithm, said registration algorithm comprising solving, for each picture element or voxel, a local Gaussian weighted least mean square problem so as to derive respective vectors forming the displacement field; and warping the second image with said displacement field.

13. A method for motion compensation between first and second images in a temporal sequence, said method comprising:

processing said first and second images in a reduction process for providing respective reduced resolution first and second images;

deriving respective first and second feature maps from said respective reduced resolution first and second images;

deriving a displacement field by processing said first and second feature maps in accordance with a registration algorithm, said registration algorithm comprising solving, for each picture element or voxel, a local Gaussian weighted least mean square problem so as to derive respective vectors forming said displacement field; and warping said second image with said displacement field.

14. A method for motion compensation in accordance with claim 13, wherein:

said step of deriving respective first and second feature maps comprises deriving the respective Laplacian of image data in said respective reduced resolution first and second images.

15. A method for motion compensation in accordance with claim 13, wherein:

said step of deriving a displacement field utilizes an initial displacement field.

16. A method for motion compensation in accordance with claim 15, wherein: a default condition for said initial displacement field is a null set.

17. A method for motion compensation in accordance with claim 15, wherein: said initial displacement field takes into account prior knowledge of a patient's motion.

18. A method for motion compensation in accordance with claim 13, wherein:

said step of processing said first and second feature maps in accordance with a registration algorithm comprises a step of expanding said displacement field to a resolution level compatible with that of said second image.

19. A method for motion compensation between a reference image and a floating image in a temporal sequence, said method comprising:

deriving a first set of modified images of progressively decreasing resolution from said reference image;

deriving a second set of modified images of progressively decreasing resolution from said floating image;

deriving a first set of feature maps from said first set of modified images;

deriving a second set of feature maps from said second set of modified images;

deriving a first displacement field from the lowest resolution members of each of the first and second sets of feature maps, respectively, and a given initial displacement field, in accordance with a registration algorithm, said registration algorithm comprising solving, for each picture element or voxel, a local Gaussian weighted least mean square problem so as to derive respective vectors forming said displacement field;

deriving a second displacement field from the next to the lowest resolution members of each of the first and second sets of feature maps, respectively, and said first displacement field obtained in the preceding step, in accordance said registration algorithm;

repeating the foregoing step for successively higher resolution members, if any are present, of each of the first and second sets of feature maps, respectively and using in each case the displacement field obtained in the step preceding the current step, until the resolution of said floating image is reached and, if no higher resolution members are present, then proceeding directly to the next step; and warping said floating image with the last obtained displacement field.

20. A method for motion compensation in accordance with claim 19, wherein:

said steps of deriving feature maps comprises deriving the Laplacian of image data in respective images.

21. A method for motion compensation in accordance with claim 19, wherein:

said steps of deriving a displacement field comprise a step of expanding said displacement field to a resolution level compatible with that of the next higher resolution level, if expansion is required.

22. A method for motion compensation in accordance with claim 19, wherein: a default condition for said given initial displacement field is a null set.

23. A method for motion compensation in accordance of claim 19, wherein: said given initial displacement field takes into account prior knowledge of a patient's motion.

24. A method for motion compensation between a reference image and a floating image in a temporal sequence, said method comprising:

(a) processing said reference and floating images in respective first and second pluralities of cascaded resolution reduction processes for providing respective pluralities of successively reduced resolution reference and floating images, herein referred to as Level 0 for the lowest resolution level and Level 1 for the next higher resolution level, Level 2 for the second next higher resolution level, and so forth for any existing higher resolution levels;

(b) deriving respective pluralities of reference and floating feature maps from said respective pluralities of successively reduced resolution reference and floating images, at resolution levels L 0, L 1, L 2 and so forth;

(c) deriving a first displacement field by processing a reference and a floating feature map, corresponding to level L 0, in accordance with a registration algorithm, said registration algorithm comprising solving, for each picture element or voxel, a local Gaussian weighted least mean square problem based on a given initial displacement field, so as to derive respective vectors forming said first displacement field;

(d) expanding said first displacement field to a resolution level compatible with that of resolution L 1, to provide an expanded first displacement field;

(e) deriving a second displacement field by processing a reference and a floating feature map, corresponding to resolution level L 1, in accordance with said registration algorithm based on said expanded first displacement field, so as to derive respective vectors forming said second displacement field;

(f) expanding said second displacement field to a resolution level compatible with that of resolution L 1, to provide an expanded second displacement field;

(g) deriving a third displacement field by processing a reference and a floating feature map, corresponding to resolution level L 2, in accordance with said registration algorithm based on said expanded second displacement field, so as to derive respective vectors forming said second displacement field; and (h) if L 2 is the resolution level of said reference and floating images, then warping said floating image by utilizing said third displacement field and ending; and if not, then (i) expanding said third displacement field to a resolution level compatible with the next higher resolution level to provide an expanded third displacement field, and (j) repeating the sequence of steps beginning with step (g) with appropriate modification of resolution levels for obtaining a displacement field corresponding to increasingly higher levels of resolution based on the last previously obtained expanded displacement field until the resolution level of said reference and floating images is reached and thereupon warping said floating image with the final displacement field obtained and ending.

25. A method for motion compensation in accordance with claim 24, wherein:
said step of providing respective pluralities of successively reduced resolution reference and floating images comprises deriving the respective Laplacian of image data in said respective pluralities of successively reduced resolution reference and floating images.

26. A method for motion compensation in accordance with claim 24, wherein:
said step of deriving a first displacement field comprises inputting a given initial displacement field.

27. A method for motion compensation between first and second images in a temporal sequence, said method comprising:
deriving respective first and second feature maps from respective reduced resolution first and second images;
deriving a first displacement field by processing said first and second feature maps in accordance with a registration algorithm, said registration algorithm comprising solving, for each picture element or voxel, a local Gaussian weighted least mean square problem so as to derive respective vectors forming said displacement field;
expanding said first displacement field to correspond with the resolution of said first and second images;
deriving a second displacement field by processing said first and second images in accordance with said registration algorithm based on said first displacement field; and
warping said second image with said second displacement field so as to obtain a motion corrected image.

28. A method for motion compensation in accordance with claim 27, wherein:
said step of deriving a first displacement field comprises a step of inputting a given initial displacement field.

29. A method for motion compensation in accordance with claim 28, wherein: a default condition for said given initial displacement field is a null set.

30. A method for motion compensation in accordance with claim 28, wherein: said given initial displacement field takes into account prior knowledge of a patient's motion.

31. A method for motion compensation in accordance with claim 27, wherein:
said step of deriving respective first and second feature maps comprises deriving the respective Laplacian of image data in said respective reduced resolution first and second images.

32. A method for motion compensation between first and second images in a temporal sequence, said method comprising:
deriving from said first image a first succession of images having progressively reduced resolution;
deriving from said second image a second succession of images having progressively reduced resolution;
deriving from said first succession of images a first succession of feature maps;
deriving from said second succession of images a second succession of feature maps;
deriving a succession of displacement fields by processing feature maps of said first succession of feature maps with corresponding feature maps of said second succession of feature maps, pertaining to the same resolution, in accordance with a registration algorithm for providing a respective displacement field, said registration algorithm comprising solving, for each picture element or voxel, a local Gaussian weighted least mean square problem so as to derive respective vectors forming said displacement field, starting with a given displacement field being used for deriving a first displacement field at the lowest resolution level and thereafter utilizing the immediately previous displacement field for deriving the next displacement field corresponding to the next higher resolution in said succession; and
warping said second image utilizing a final displacement field derived at the resolution level of said first and second images.

33. A method for motion compensation in accordance with claim 32, comprising:
expanding said each resolution field, except for said given field and said final field to correspond with the next higher resolution.

34. A method for motion compensation between a reference image and a floating image in a temporal sequence, said method comprising:
(a) processing said reference and floating images in respective first and second pluralities of cascaded resolution reduction processes for providing respective pluralities of successively reduced resolution reference and floating images, herein referred to as Level 0 for the lowest resolution level and Level 1 for the next higher resolution level, Level 2 for the second next higher resolution level, and so forth for any existing higher resolution levels;

(b) deriving respective pluralities of reference and floating feature maps from said respective pluralities of successively reduced resolution reference and floating images, at resolution levels L 0, L 1, L 2, in order of increasing resolution with 2 being the resolution level of said reference and floating images;

(c) deriving a first displacement field by processing a reference and a floating feature map, corresponding to level L 0, in accordance with a registration algorithm, said registration algorithm comprising solving, for each picture element or voxel, a local Gaussian weighted least mean square problem based on a given initial displacement field, so as to derive respective vectors forming said first displacement field;

(d) expanding said first displacement field to a resolution level compatible with that of resolution L 1, to provide an expanded first displacement field;

(e) deriving a second displacement field by processing a reference and a floating feature map, corresponding to resolution level L 1, in accordance with said registration algorithm based on said expanded first displacement field, so as to derive respective vectors forming said second displacement field;

(f) expanding said second displacement field to a resolution level compatible with that of resolution L 2, to provide an expanded second displacement field;

(g) deriving a final displacement field by processing a reference and a floating feature map, corresponding to resolution level L 2, in accordance with said registration algorithm based on said expanded second displacement field, so as to derive respective vectors forming said final displacement field; and (h) warping said floating image by utilizing said final displacement field.

35. A method for motion compensation in accordance with claim 34, wherein: a default condition for said given initial displacement field is a null set.

36. A method for motion compensation in accordance with claim 34, wherein: said given initial displacement field takes into account prior knowledge of a patient's motion.

37. A method for motion compensation in accordance with claim 34, wherein:

said step of deriving feature maps comprises deriving the respective Laplacian of image data in said respective reduced resolution first and second images.

38. A method for motion compensation in accordance with claim 34, wherein step (c), deriving a first displacement field, includes the steps of:

labeling each voxel by an index j, whereof coordinates are given by a vector $x_j \in R^3$;

defining $p_j^k \in R^3$ as the displacement vector recovered at point $x_j$ after the $k^{th}$ iteration of said algorithm;

given a set of displacement vectors $p_j^k$, denoting a corrected version of said floating feature map at iteration k by $J_{2,k}$:

$\forall j, J_{2,k}(x_j) = J_2(x_j + p_j^k)$;

defining at each voxel j, an update rule $p_j^{k+1} = p_j^k + s_j^k$ with $s_j^k$ as a solution of the non-linear least mean square problem:

$$\min_{s_j^k} \sum_i G_\sigma(x_j - x_i) \cdot (z_i^k(s_j^k))^2$$

where $z_i^k(s) = J_1(x_i) - J_{2,k}(x_i + s)$ and $G_\sigma(x)$ is an isotropic tri-dimensional Gaussian kernel:

$$G_\sigma(x) = \frac{1}{\sqrt{(2\pi)^3 \sigma^6}} e^{-\frac{|x|^2}{\sigma^2}}$$

of standard deviation $\sigma$;

solving a linearized version of said non-linear least mean square problem by minimizing the following criterion:

$$E(s_j^k) = \sum_i G_\sigma(x_j - x_i) \cdot (z_i^k(0) + \nabla z_i^k(0)^T \cdot s_j^k)^2$$

where $\nabla z_i^k(s)$ is defined as $\nabla z_i^k(s) = -\nabla J_{2,k}(x_i + s)$; computing the first variation of $E(s_j^k)$, the necessary condition of optimality $\forall h, dE(s_j^k) \cdot h = 0$ to yield a closed-form solution for $s_j^k$:

$$s_j^k = -\left(\sum_i G_\sigma(x_j - x_i) \nabla z_i^k(0) \nabla z_i^k(0)^T\right)^{-1} \left(\sum_i G_\sigma(x_j - x_i) \nabla z_i^k(0) z_i^k(0)\right).$$

39. A system for performing image motion compensation, comprising:

a memory device for storing a program and other data; and a processor in communication with said memory device, said processor being operative with said program to perform:

a method for motion compensation between first and second images in a temporal sequence, said method comprising:

processing said first and second images in a reduction process for providing respective reduced resolution first and second images;

deriving respective first and second feature maps from said respective reduced resolution first and second images;

deriving a displacement field by processing said first and second feature maps in accordance with a registration algorithm, said registration algorithm comprising solving, for each picture element or voxel, a local Gaussian weighted least mean square problem so as to derive respective vectors forming said displacement field; and warping said second image with said displacement field.

40. A computer program readable medium having a computer program logic recorded thereon for program code for performing image motion compensation by:

a method for motion compensation between first and second images in a temporal sequence, said method comprising:

processing said first and second images in a reduction process for providing respective reduced resolution first and second images;

deriving respective first and second feature maps from said respective reduced resolution first and second images;

deriving a displacement field by processing said first and second feature maps in accordance with a registration algorithm, said registration algorithm comprising solving, for each picture element or voxel, a local Gaussian weighted least mean square problem so as to derive respective vectors forming said displacement field; and warping said second image with said displacement field.

41. A method for motion compensation between first and second images in a temporal sequence, said method comprising:

deriving a displacement field by processing said first and second images in accordance with a process, said process including a registration algorithm, said registration algorithm comprising solving, for each picture element or voxel, a local Gaussian weighted least mean square problem so as to derive respective vectors forming said displacement field; and warping said second image with said displacement field.

42. A method for motion compensation in accordance with claim 41, wherein said step of processing said first and second images in accordance with a process includes a step of deriving respective first and second feature maps from said first and second images and applying said registration algorithm to said feature maps, respectively.

43. A method for motion compensation in accordance with claim 41, wherein said step of deriving a displacement field utilizes a previously derived displacement field for deriving said displacement field.

44. A method for motion compensation in accordance with claim 41, wherein said step of deriving a displacement field utilizes a given initial displacement field for an initial derivation of said displacement field.

* * * * *